June 16, 1964   A. E. CONOVER   3,137,382
MOVING SIDEWALK CONSTRUCTION

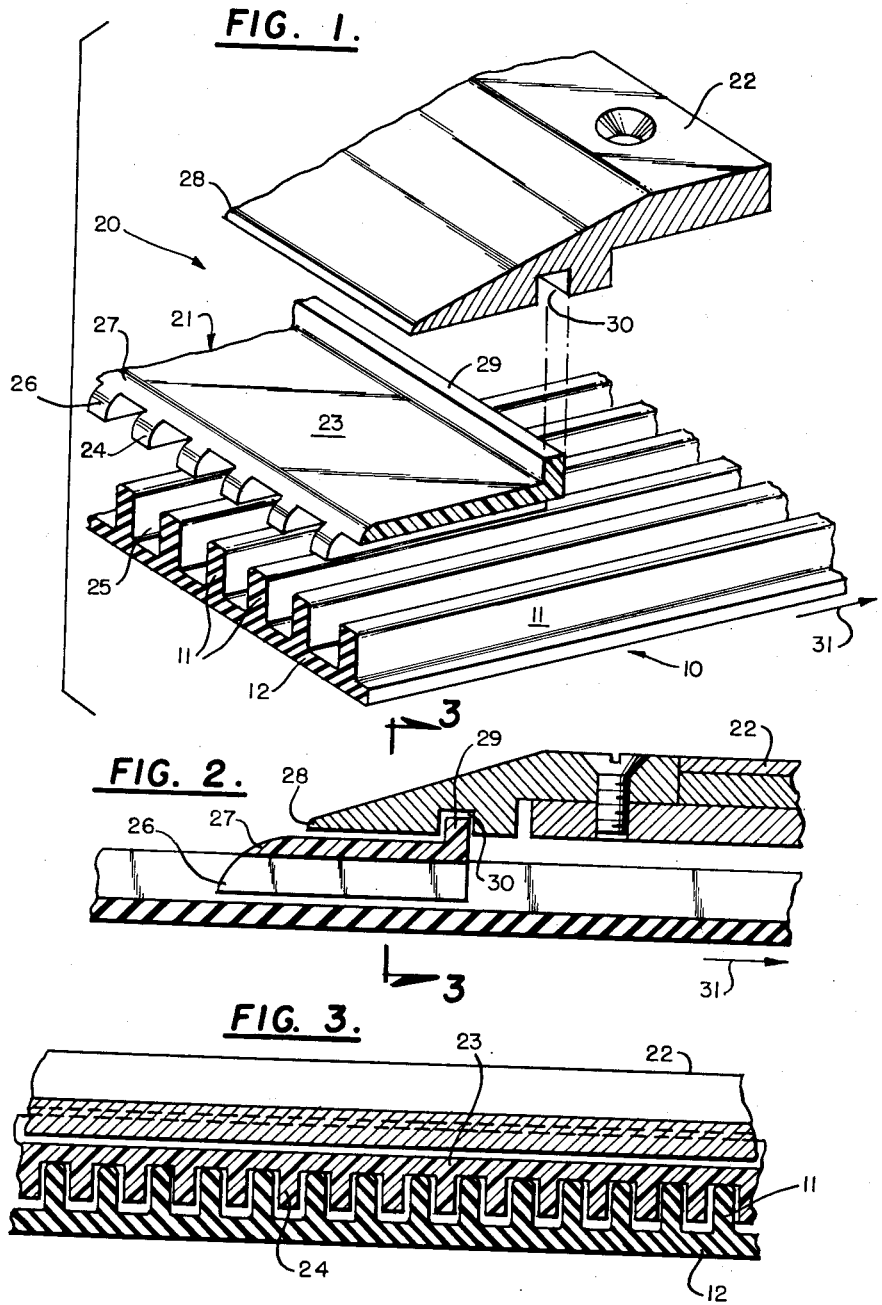

Filed July 12, 1962   2 Sheets-Sheet 2

INVENTOR

Alonzo E. Conover

BY *John L. Shortley*

ATTORNEY

United States Patent Office 3,137,382
Patented June 16, 1964

3,137,382
MOVING SIDEWALK CONSTRUCTION
Alonzo Edward Conover, Southold, N.Y., assignor to Hewitt-Robins Incorporated, Stamford, Conn.
Filed July 12, 1962, Ser. No. 209,430
6 Claims. (Cl. 198—16)

This invention relates to an improved take-off step for a moving sidewalk. Moving sidewalks to which the improvement of this invention is applicable are now in use. They comprise moving belts which are similar to bulk material and package conveying belts long known in the art.

It has been known to provide, in moving sidewalks, a ribbed belt and associated sliding transverse take-off step having projections extending into the groove of the belt to minimize the risk of trapping material between the belt and take-off step or of having the material being swept by the belt beneath the step. In such an arrangement the take-off step, as presently known, comprises a heavy gage steel plate of a width substantially equal to the width of the belt. Projections extend downwardly and forwardly of the plate. The projections are comb-like teeth which are intercalated with the ribs of the belt. Thus the teeth tend to prevent newspapers, etc. from being swept under the steps by the belt. The plate is provided with followers which engage at the edges of the belt and guide the take-off step in order that the projections will remain meshed in the grooves of the belt. This guiding structure; i.e., means contacting the side edges of the belt, is required since it is not feasible to maintain a non-metallic or non-rigid moving belt within close tracking tolerances. As a result the take-off step moves from side to side with the belt. The take-off step must be built sufficiently strong to withstand the weight of the passengers as they step off the sidewalk. It must not bend. If it did it would be apt to bear on the belt hard enough to gouge or tear the belt, or at least it would accelerate wear and interfere with the movement of the belt and place increased strain on the belt and driving mechanism. Accuracy of control of the belt-step relationship is required for similar reasons, i.e., the projections must be aligned with the grooves, and thus the guiding by the side of the belt must be accurate. This requires control of the belt edge-groove relationship in the manufacturing of the belt. Furthermore, if the edge of the belt should become worn irregularly or torn the tracking of the step-off plate may be effected sufficiently to increase the rate of wear of the belt and the danger of further damage. Thus the known arrangement can be unsatisfactory due to binding between the rib belt and projections of the take-off step during heavy load operation of the sidewalk due to stretching of the belt, as well as when persons are stepping on the step-off plate, as well as due to the possibility of interference between the projections of the step and the belt arising because of irregularity of the edge-groove relationship.

A primary object of this invention is to overcome the problems that can arise with the known arrangements. A more specific object is to provide a simple structure permitting the use of comb-like means at the end of the moving sidewalk adjacent the step-off point and to eliminate the need for a tracking device cooperable with the edges of the belt.

Another factor to be considered is the groove width. This is particularly important in view of the narrow heels apt to be worn by young ladies today. Where the tracking problems mentioned above may occur it is desirable to maintain wide grooves in the belt, as well as a greater allowance between the groove width and the tooth thickness than would be necessary if the tracking problem were not attendent the use of the structure. These considerations are required in view of the fact that the belt wanders in its movemetn and that stretching may occur during the operation of the belt. Accordingly another object of the invention is to provide for use of narrower grooves in the belt and narrower teeth on the comb members, as well as means for permitting closer spacing of the teeth and the rib.

Yet a further object of this invention is to provide a take-off step embodying comb-like means for cooperating with a rib belt which has all the advantages of the heretofore known structures as far as preventing the entrapment of articles between the belt and step-off plate, yet wherein a relatively much lighter comb can be employed than heretofore used. This has several advantages, among which are:

(1) It facilitates movement of the comb in following the fluctuations of the belt.

(2) It greatly decreases likelihood of wear between the comb and the belt.

Still another object of the invention is to provide a comb structure which is movable by the belt ribs themselves and not movable in accordance with the movement of the edge of the belt.

Still another object of the invention is to provide a step-off structure, including a relatively rigid member which is adapted to bear the weight of the users of the sidewalk, as well as that of any carts, etc. that may happen to be placed on the sidewalk from time to time and a comb-like structure associated with the plate, cooperable with the belt for preventing entrapment of material between the belt and the plate and wherein the load of persons and equipment moving off the conveyor is taken by the rigid step-off member entirely and the comb structure is isolated from such load. Thus the comb structure can be relatively light and easily moved by the belt and there will be much less likelihood of the comb structure causing damage to the belt or interfering with the motion of the sidewalk.

These and other objects and advantages will become apparent from the following description and the accompanying drawings wherein:

FIGURE 1 is an exploded fragmentary, partly sectional perspective view of the invention.

FIGURE 2 is a sectional side elevational view of the embodiment seen in FIGURE 1 illustrating the operative relationship.

FIGURE 3 is a cross sectional view taken along line 3—3 of FIGURE 2.

Figure 4:
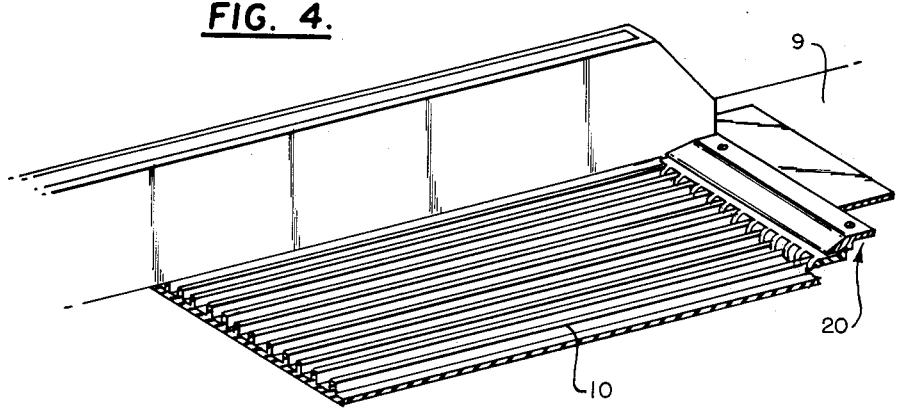
FIGURE 4 is a fragmentary perspective view of a sidewalk embodying the invention.

As illustrated in FIGURES 1 and 4, the invention comprises a sidewalk belt generally designated 10 having a plurality of closely spaced ribs 11 disposed longitudinally and integral with the belt web 12. The belt may have reinforcing and other characteristics as known in the art.

The take-off step assembly generally designated 20 comprises a comb member 21 and associated step-off lip plate 22. Plate 22 is secured to fixed walkway 9. The belt may be of any suitable width. The comb member 21 comprises a plate 23 having a plurality of depending ribs 24 corresponding with the grooves 25 of the belt 10. Each rib 24 of the comb member has an upwardly and inwardly turned leading edge or curved surface 26 fairing into the curved leading edge 27 of the comb plate 23 and similarly curved surface 28 of the fixed lip plate 22.

The comb member is provided with an upwardly extending key 29 which fits loosely within a recess 30 of the fixed step-off lip plate 22 as best seen in FIGURE 2. It will be apparent therefore that the comb member 21 is thus free to slide relative to the fixed lip plate 22 in a plane transverse to the length of the belt, but is constrained against movement in the direction of belt movement indicated by the arrows 31 in FIGURES 1 and 2. Also as best seen in FIGURE 2 the comb member has freedom of movement in a vertical plane limited by the depth of the slot or recess 30.

Referring more particularly to FIGURE 2, it will be seen that a lifting surface is provided by the curved leading edges of the comb ribs and fixed lip plate to discharge articles from the standing surface of the belt with little danger of the articles becoming trapped between the take-off step and the belt.

Figure 5:
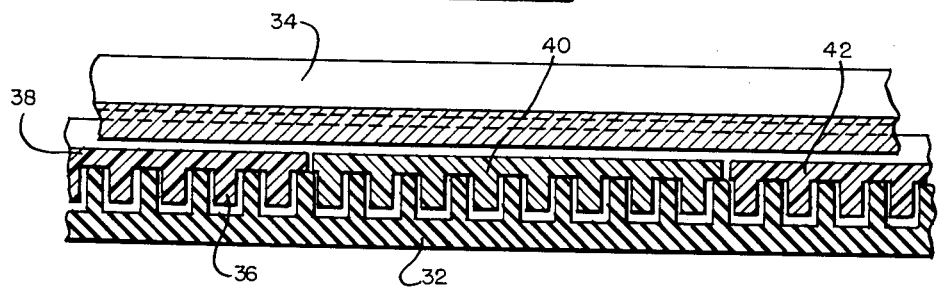
FIGURE 5 is a fragmentary sectional elevation illustrating a second form of the invention.

FIGURE 5 illustrates a second form of the invention. In this instance the grooved belt 32 is the same as belt 12. The step-off lip plate 34 is also the same as plate 22. Likewise the comb member 36 is of the same construction as member 23 with the exception that it is formed of separate, discrete, sections 38, 40, 42, etc. Preferably these are of equal width. The number for use with any particular belt will be selected in accordance with the belt width, number of grooves, etc. for any particular installation. Six were adjusted to be desirable for the illustrated example.

The use of a number of combs instead of one provides several advantages, among which are: (1) closer tolerances between the belt and comb fingers are possible and (2) the depth of the finger can be greater than where a single comb is employed. These follow from the fact that each comb member is less susceptible to binding between belt ribs due to the minimum belt surface area to which it is exposed, and because each comb member is free to move relative to each of the adjacent comb members. If one comb should bind temporarily it will not influence the operation of the adjacent comb and so on across the belt. Therefore, localized binding does not cause other combs to operate so as to bind under the influence of conditions remote therefrom.

To further reduce the effect of binding and minimize friction forces between a rubber surfaced belt and the comb member, said members are made of a low friction plastic such as Teflon, Rulon or the like. It is noted in this regard that the use of such material for the purpose stated is permissible because the comb members are covered or protected by the lip plate as clearly illustrated in the drawing.

From the foregoing it will be apparent that the comb members can be made of low friction plastic materials and are supported on the standing surface of the belt to prevent entrapment of articles resting thereon and that passengers emerging from the traveling surface of the belt onto a transverse walkway do not adversely effect operation of the comb members or create interference between the comb members and the belt due to their weight.

From the foregoing detailed description of an embodiment of this invention it is understood that details may be modified or changed without departure from apparent teachings thereof. Therefore, the foregoing is given only by way of an example of the invention without intending to limit the scope of the annexed claims.

I claim:

1. A moving sidewalk comprising in combination a movable belt having a ribbed surface defining a plurality of longitudinal grooves, a take-off step comprising fixed means overlying said belt, a plurality of discrete independently movable members intermediate said belt and said fixed means, said discrete members each having at least one projection extending into one of said grooves, and means operatively associated with said fixed means for securing said members against longitudinal displacement in a plane parallel with the plane of said belt, said members being mounted for movement relative said fixed means and relative each other in a direction transverse to said belt and vertically with respect to said fixed means and with respect to each other under urging of the belt so that the comb plate members may follow the movement of said belt relative said take-off step.

2. A moving sidewalk according to claim 1 wherein said members are made of low friction plastic material.

3. A moving sidewalk comprising in combination an endless, movable belt, said belt having a ribbed surface defining a plurality of longitudinally extending grooves, a transverse step-off lip plate, said lip plate having a substantially continuous impervious upper surface, a comb member, said comb member having a substantially continuous impervious upper surface, the latter surface being positioned beneath said lip plate and in part forming a continuation of said upper surface of said lip plate, said comb member having a plurality of projections extending into some of said grooves, said comb member and said plate having inter-engaging members providing for movement of said comb member vertically relative said lip plate and transversely relative said lip plate and said belt under urging of the rib of said belt, said inter-engaging members restraining said comb member from movement longitudinally of said belt, said comb member being vertically supported by said belt.

4. The sidewalk of claim 3 wherein said inter-engaged members comprise a key member and a groove, with the key member being mounted in the groove and both of said members extending transversely with respect to said belt.

5. The sidewalk of claim 3 wherein said comb member is formed of a plurality of separate, independently movable members disposed across the width of said belt, said members being movable vertically and transversely of said belt relative each other.

6. A moving sidewalk comprising an endless elastic belt having a plurality of longitudinal grooves defined by a ribbed standing surface thereof, a take-off step comprising a fixed walk-way spaced above said standing surfaces, a lip plate coextensive with and fixedly secured to said walk-way and extending outwardly therefrom in a plane parallel to said standing surface, said lip plate having a substantially continuous, impervious upper surface, a plurality of low friction, discrete independently movable plastic comb members each having a plate portion extending in a plane parallel to said surface beneath the said lip plate, said plate portion of said comb members being substantially impervious and forming in part a continuation of said upper surface of said lip plate, a plurality of depending projections integral with each said plate portion extending into grooves of said belt beneath the said comb member, a key member integral with each said plate portion extending tranversely of said projections, a vertical groove in said lip plate extending across said belt and loosely receiving the key members, whereby said comb members are secured by said key members within the groove of said lip plate against movement longitudinally of said belt under the influence of friction between said belt and said comb members and said members are supported by said belt and independently movable vertically with respect to said lip plate and transversely of said walk-way with respect to said lip plate so that the comb members can follow the movement of said belt relative said lip plate independently of each other.

References Cited in the file of this patent

UNITED STATES PATENTS

| | | |
|---|---|---|
| 2,030,103 | Dunlop | Feb. 11, 1936 |
| 2,953,232 | Bankauf et al. | Sept. 20, 1960 |
| 3,071,234 | Moore et al. | Jan. 1, 1963 |

FOREIGN PATENTS

| | | |
|---|---|---|
| 1,120,628 | France | July 10, 1956 |